(12) United States Patent
Butler

(10) Patent No.: US 7,530,579 B2
(45) Date of Patent: May 12, 2009

(54) HANDTRUCK

(76) Inventor: Steven J. Butler, 902 N. 8th St., Humbolt, KS (US) 66748

( * ) Notice: Subject to any disclaimer, the term of this patent is extended or adjusted under 35 U.S.C. 154(b) by 38 days.

(21) Appl. No.: 11/748,017

(22) Filed: May 14, 2007

(65) Prior Publication Data

US 2008/0284120 A1 Nov. 20, 2008

(51) Int. Cl.
*B02B 1/12* (2006.01)
(52) U.S. Cl. .............. 280/47.28; 280/47.27; 280/47.24; 280/47.17; 280/83; 280/47.34; 280/124.12; 280/137.501; 280/33.991; 280/47.11; 280/655.1; 414/444; 414/490; 414/446
(58) Field of Classification Search .............. 280/47.28, 280/47.27, 47.24, 47.17, 83, 47.34, 124.12, 280/137.501, 33.991, 47.11, 655.1; 414/490, 414/444, 446
See application file for complete search history.

(56) References Cited

U.S. PATENT DOCUMENTS

| | | | | |
|---|---|---|---|---|
| 1,542,023 A | * | 6/1925 | Alexander | 414/490 |
| 2,452,258 A | * | 10/1948 | Nielsen | 414/490 |
| 2,682,348 A | * | 6/1954 | Stumphauzer | 414/490 |
| 3,403,800 A | * | 10/1968 | Botello | 414/490 |
| 5,290,051 A | | 3/1994 | Olson | |
| 5,624,224 A | * | 4/1997 | Brandenburg | 414/490 |
| 5,971,693 A | * | 10/1999 | Story et al. | 414/490 |

* cited by examiner

*Primary Examiner*—Christopher P Ellis
*Assistant Examiner*—Cynthia F Collado
(74) *Attorney, Agent, or Firm*—Dale J. Ream

(57) ABSTRACT

A handtruck includes a tower having upper and lower ends and a handle adjacent the tower upper end. A support plate is generally adjacent the tower lower end and extends outwardly, the support plate configured to support a load. At least one wheel is operatively coupled to the tower or support plate. The handtruck includes an ejection member for moving the load from the support plate. The ejection member includes an elongate lever having upper and lower ends and being pivotally coupled to the tower. The ejection member includes a pushplate pivotally coupled to the lever and is movable between a rest configuration when the elongate lever upper end is relatively adjacent the tower and an offload configuration when the elongate lever upper end is relatively distant to the tower. A distal end of the pushplate is in slidable contact with the pushplate when moving between rest and offload configurations.

9 Claims, 3 Drawing Sheets

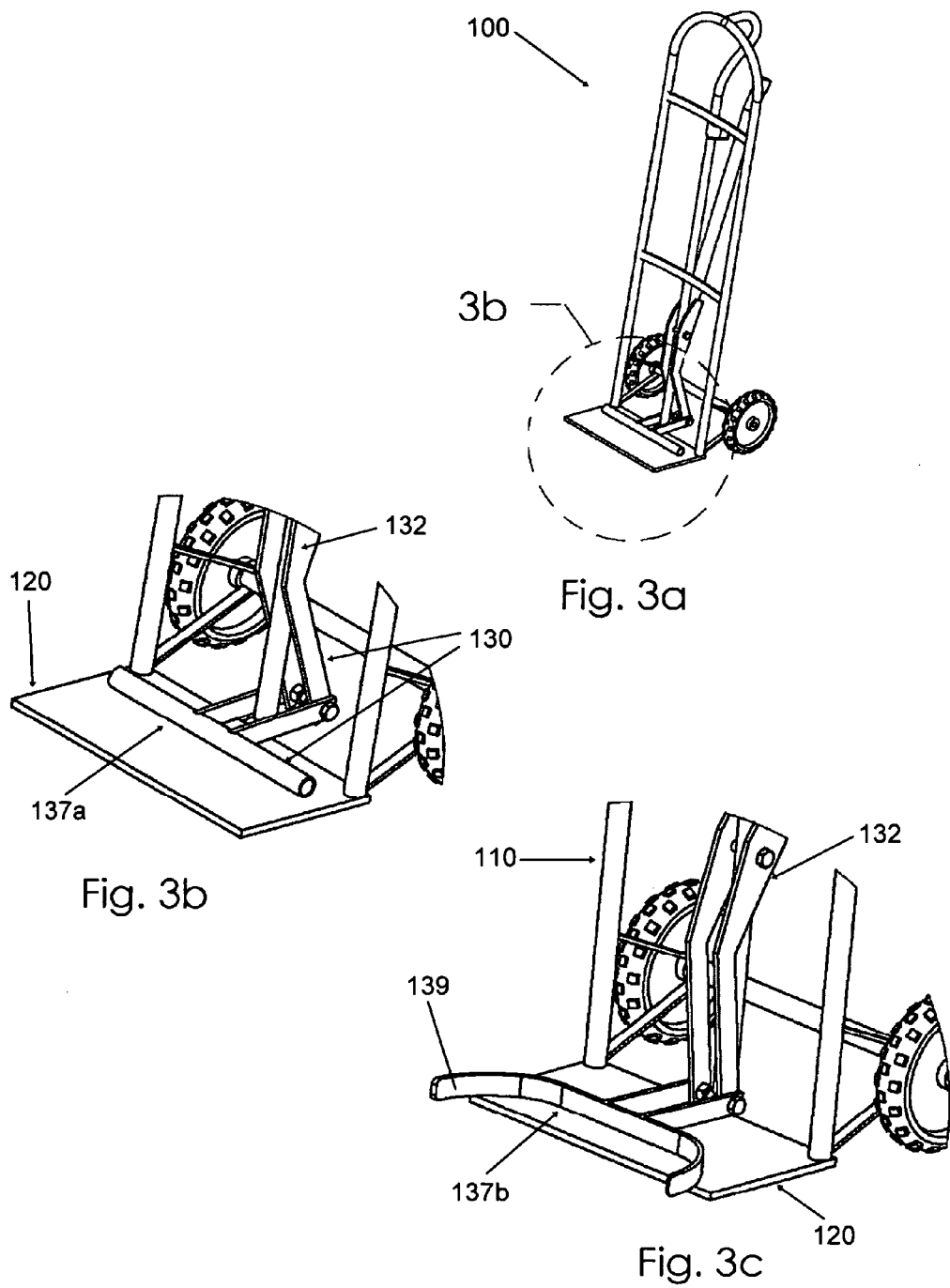

HANDTRUCK

BACKGROUND OF THE INVENTION

This invention relates generally to loading and transporting devices and, more particularly, to a handtruck for smoothly and efficiently transporting and then offloading an article.

It is common to move boxes, stacks of paper, or even small appliances using a dolly or handtruck. This type of device typically includes a support plate that may be inserted beneath the article to be carried and then leaned backward and rolled to a desired location. To offload the article(s), the support plate must be pulled out from underneath the articles, or the articles must be slid from or picked up from the support plate. This offloading procedure may be awkward, resulting in dropping the articles or even injuring the back of the person lifting them.

Various handtrucks having pushplate devices have been proposed in the art for mechanically pushing a load off of the support plate of the handtruck. Although assumably effective for their intended purposes, these devices and proposals may result in elevating or even tipping a load as it is offloaded. More particularly, the action of an ejection lever may cause a pushplate at is lowermost end to move upwardly causing articles that are top heavy or unevenly weighted to tip forward.

Therefore, it would be desirable to have a handtruck that includes an ejection member for smoothly and efficiently carrying and offloading articles such as boxes, miscellaneous articles, or even buckets. Further, it would be desirable to have a handtruck that includes a pushplate that maintains contact with or in close proximity to the support plate as it moves between rest and offloading configurations. In addition, it would be desirable to have a handtruck in which the pushplate is selectively removable and interchangeable with a pushplate having another configuration.

SUMMARY OF THE INVENTION

Therefore, a handtruck according to a preferred embodiment of the present invention includes a tower having upper and lower ends with at least one handle generally adjacent the tower upper end. Further, a support plate is generally adjacent the tower lower end and extends outwardly therefrom, the support plate being configured to support a load. At least one wheel is operatively coupled either to the tower or the support plate. The handtruck includes an ejection member for moving the load from the support plate. The ejection member includes an elongate lever having upper and lower ends and being pivotally coupled to the tower. The ejection member further includes a pushplate pivotally coupled to the elongate lever and is movable between a rest configuration when the elongate lever upper end is relatively adjacent the tower and an offload configuration when the elongate lever upper end is relatively distant to the tower. A distal end of the pushplate is in slidable contact with the support plate as it is moved between the rest and offload configurations.

Therefore, a general object of this invention is to provide a handtruck for smoothly and efficiently carrying and offloading an article from the handtruck support plate.

Another object of this invention is to provide a handtruck, as aforesaid, having a pushplate for moving a load from the support plate without tipping the load forward.

Still another object of this invention is to provide a handtruck, as aforesaid, in which the pushplate maintains contact or close contact with the support plate while moving a load.

Yet another object of this invention is to provide a handtruck, as aforesaid, in which the pushplate is removable and interchangeable.

A further object of this invention is to provide a handtruck, as aforesaid, that is easy to operate by a user.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2a is a perspective view of the handtruck as in FIG. 1;

FIG. 2b is an isolated view on an enlarged scale of a portion of the handtruck taken from FIG. 2a;

FIG. 3a is another perspective view of the handtruck as in FIG. 2a;

FIG. 3b is an isolated view on an enlarged scale of a portion of the handtruck taken from FIG. 3a; and FIG. 3c is another enlarged view on an enlarged scale of a portion of the handtruck as in FIG. 3b with an alternative pushplate.

DESCRIPTION OF THE PREFERRED EMBODIMENT

A handtruck 100 according to the present invention will now be described in detail with reference to FIGS. 1 through 3c of the accompanying drawings. More particularly, a handtruck 100 according to the current invention includes a tower 110, a support plate 120 for supporting a load, and an ejection member 130 for moving the load from the support plate 120.

Figure 1:
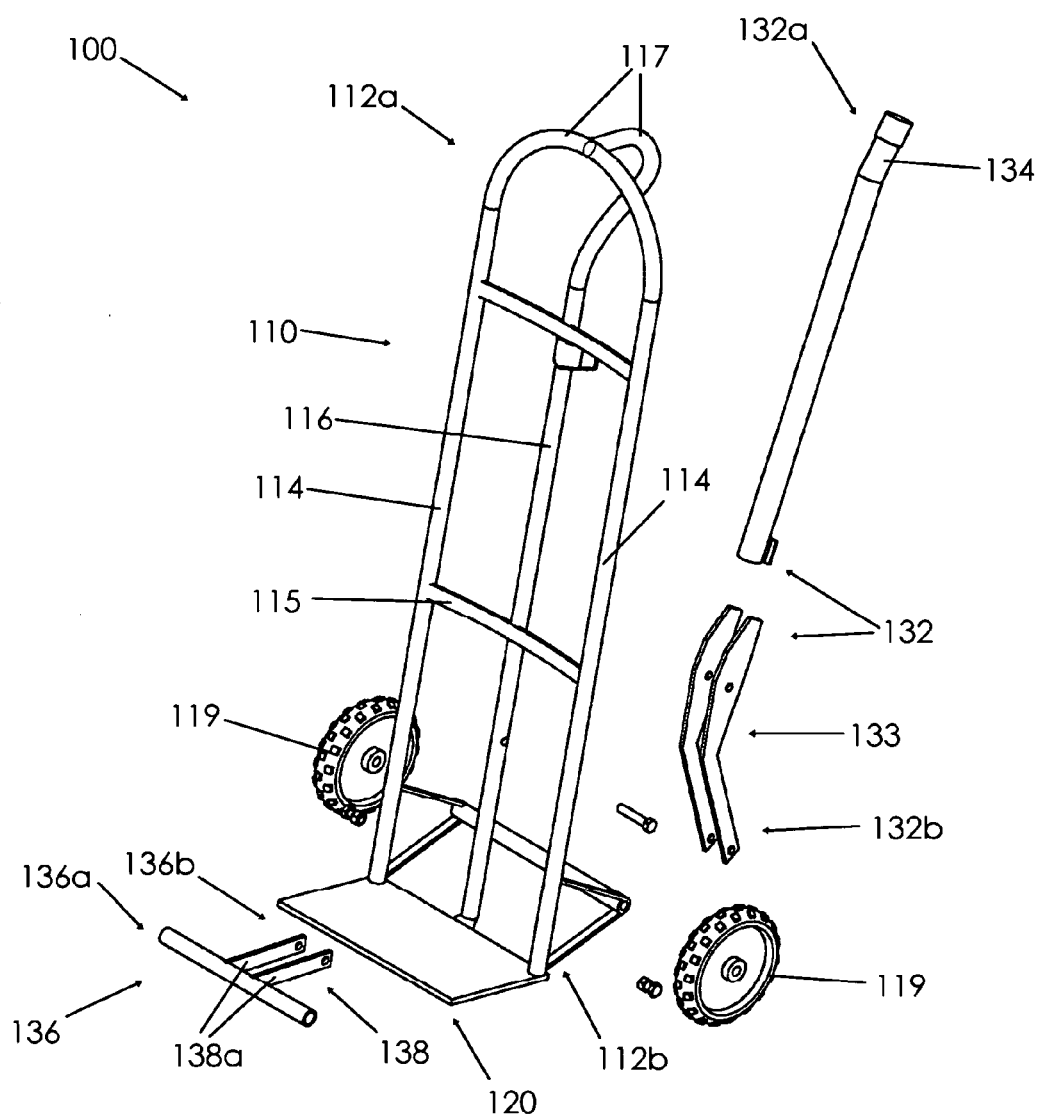
FIG. 1 is an exploded view of a handtruck according to a preferred embodiment of the present invention.
Figures 2A, 2B:
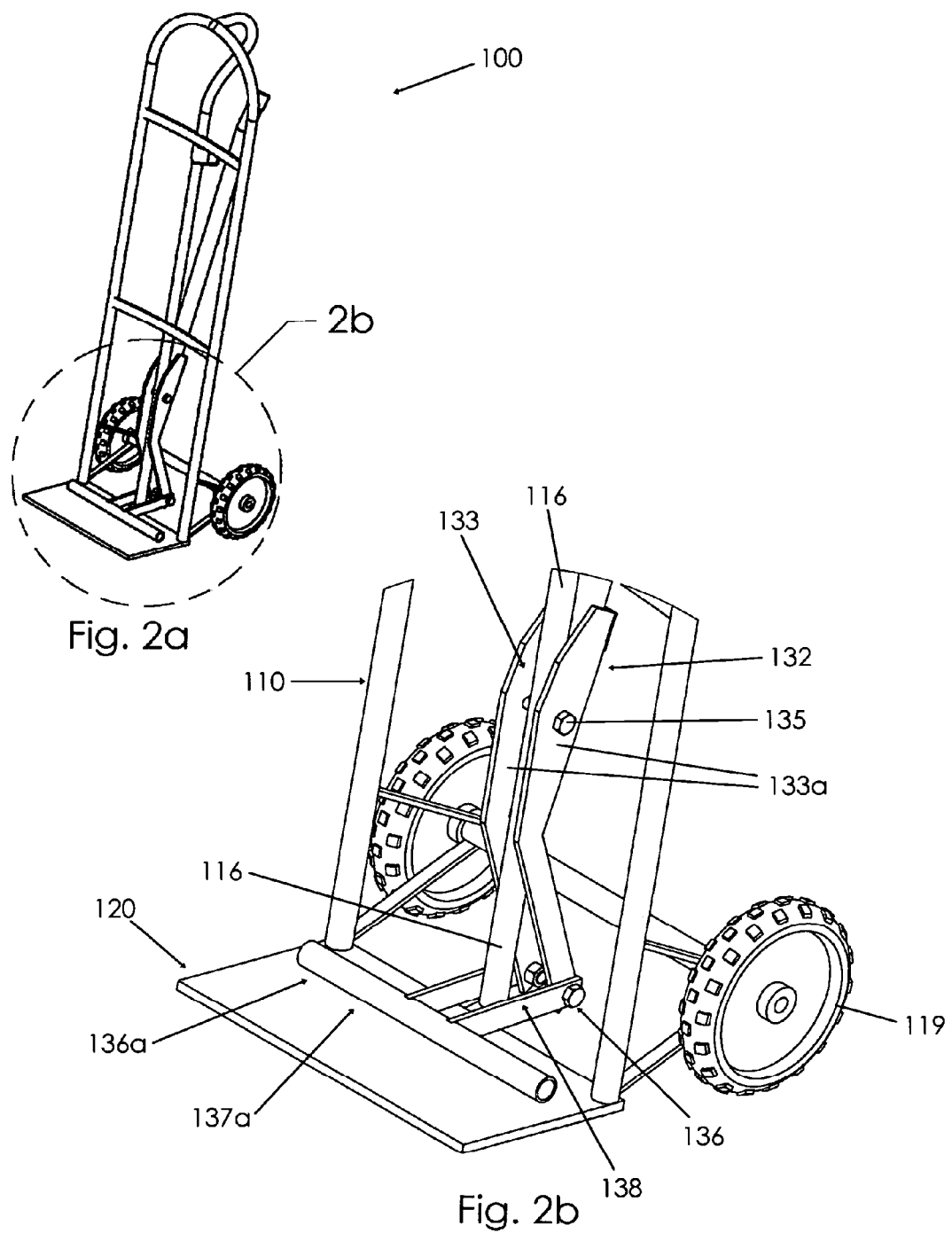

As shown in FIG. 1, the tower 110 has upper and lower ends 112a, 112b. While the tower 110 shown in FIG. 1 has a pair of outer members 114 separated by horizontal bracing 115, numerous configurations may be used based upon such considerations as material properties, work environment, and anticipated work load. The tower 110 may include a generally central vertical member 116. It should be appreciated that directions such as "upper", "lower", "vertical", and "horizontal" are used herein to assist in understanding the current invention and should not be interpreted to mean always at a greater height, always at a lower height, ninety degrees from the horizon, or parallel to the horizon; the terms do, however reference the handtruck 100 when it is positioned as generally shown in FIG. 2a. At least one handle 117 is generally adjacent the tower upper end 112a, and as shown in FIG. 1, the tower 110 may define the handle(s) 117. At least one wheel 119 is operatively coupled to the tower 110 (FIG. 2b) or the support plate 120 to allow the tower 110 to be easily moved by a user.

The support plate 120 is generally adjacent the tower lower end 112b and extends outwardly therefrom, as shown in FIG. 1. The support plate 120 is configured to support a load. While this configuration may be generally planar as shown in FIG. 1, it may alternately include a divot or other appropriate design, depending primarily on the intended load that will be supported. The support plate 120 may be generally perpendicular to the tower 110, or the support plate 120 may be angled relative to the tower 110.

The ejection member 130 includes an elongate lever 132 and a pushplate 136. The elongate lever 132 has upper and lower ends 132a, 132b and is pivotally coupled to the tower 110. As shown in FIG. 2b, the elongate lever 132 may be coupled to the vertical member 116 at a pivot point 135. The elongate lever 132 may have a forked configuration 133 at the pivot point 135, and the vertical member 116 may be located within the forked configuration 133 (e.g., between the forks 133a of the elongate lever 132) at the pivot point 135. A handle 134 may be adjacent the elongate lever upper end 132a (FIG. 1). The elongate lever 132 may be constructed of distinct members as shown in FIG. 1, or the elongate lever 132 may alternately be constructed of a unitary material.

The pushplate 136 has distal and proximal ends 136a, 136b and is pivotally coupled to the elongate lever 132 adjacent the proximal end 136b (FIG. 2b). The pushplate 136 is movable between a rest configuration 137a occurring when the elongate lever upper end 132a is relatively adjacent the tower 110 (FIG. 2b) and an offload configuration 137b occurring when the elongate lever upper end 132a is relatively distant to the tower 110 (FIG. 3c). In other words, movement of the elongate lever upper end 132a away from the tower 110 may move the pushplate 136 from the rest configuration 137a to the offload configuration 137b, and movement of the elongate lever upper end 132a toward the tower 110 may move the pushplate 136 from the offload configuration 137b to the rest configuration 137a. The pushplate 136 may include a forked portion 138, and the vertical member 116 may be located within the forked portion 138 (e.g., between the forks 138a of the pushplate 136) when the pushplate 138 is at the rest configuration 137a (FIG. 2b). The interaction between the forked portion 138 and the vertical member 116 may help stabilize or direct the travel of the pushplate 136.

The pushplate distal end 136a may be in slidable contact with the support plate 120 while moving between the rest and offload configurations 137a, 137b. Additionally, or alternately, the pushplate 136 may be generally parallel to the support plate 120 when the pushplate is at the offload configuration 137b, and the pushplate distal end 136a may move parallel to the support plate 120 while moving between the rest and offload configurations 137a, 137b. Slidable contact and parallel movement may contribute to smooth and efficient offloading of the load from the support plate 120. This configuration and operation may also inhibit any tipping of the load. The pushplate distal end 136a may have a generally cylindrical cross section (FIG. 1) or any other appropriately shaped cross section (such as rectangular as shown in FIG. 3c). In addition, the pushplate distal end 136a may be planar (FIG. 1), or it may include at least one side 139 that extends away from the tower 110 (FIG. 3c). The side(s) 139 may be configured to be complementary to a barrel or any other desired load, for example. It is understood that the pushplate 136 is removable and interchangeable.

In use, the user may hold the handle(s) 117 and roll the tower 110 using the wheel(s) 119 to a load (e.g. a box, crate, barrel, etc.), and the load may be placed atop the support plate 120. The tower 110 may then be rolled to a second location at which the load will be positioned. To remove the load from the support plate 120, the elongate lever upper end 132a may be moved away from the tower 110, such as by a user putting force on the handle 134. The movement of the elongate lever upper end 132a away from the tower 110 causes the elongate lever lower end 132b to move toward the pushplate distal end 136a due to the pivotal attachment of the elongate lever 132 to the tower 110. Movement of the elongate lever lower end 132b toward the pushplate distal end 136a causes the pushplate 136 to move from the rest configuration 137a (FIG. 2b) to the offload configuration 137b (FIG. 3c). As the pushplate 136 moves to the offload configuration 137b, the distal end 136a may remain in slidable contact with the support plate 120, and the pushplate distal end 136a may move parallel to the support plate 120. Movement of the pushplate 136 to the offload configuration 137b may remove the load from the support plate 120. Once the pushplate 136 is at the offload configuration 137b, the elongate lever upper end 132a may be moved toward the tower 110, causing the pushplate 136 to return to the rest configuration 137a.

It is understood that while certain forms of this invention have been illustrated and described, it is not limited thereto except insofar as such limitations are included in the following claims and allowable functional equivalents thereof.

The invention claimed is:

1. A handtruck, comprising:
   a tower having upper and lower ends and a generally central vertical member;
   at least one handle generally adjacent said tower upper end;
   a support plate generally adjacent said tower lower end and extending outwardly therefrom, said support plate being configured to support a load;
   at least one wheel operatively coupled to at least one of said tower and said support plate;
   an ejection member for moving said load from said support plate, said ejection member comprising:
      an elongate lever having upper and lower ends and being pivotally coupled to said vertical member at a first pivot point;
      a pushplate having proximal and distal ends, said pushplate being pivotally and removably coupled to said elongate lever at a second pivot point that is situated at said pushplate proximal end, said pushplate including a pushplate forked portion, said pushplate being movable between a rest configuration when said elongate lever upper end is relatively adjacent said tower upper end and an offload configuration when said elongate lever upper end is relatively distant from said tower upper end;
      wherein said elongate lever includes a forked configuration at said first pivot point such that said lower ends of said elongate lever, at said rest configuration, extend rearwardly relative to said vertical member and are connected distally to said second pivot point and said lower ends of said elongate lever, at said offload configuration, are situated generally parallel with and adjacent to said vertical member;
   wherein:
      said elongate lever upper end is generally adjacent said tower upper end at said rest configuration;
      said vertical member is located between said elongate lever forks at said first pivot point; and
      said vertical member is situated between said pushplate forks when said pushplate is at said rest configuration.

2. The handtruck as in claim 1, wherein:
   said pushplate has a distal end; and
   said pushplate distal end is in slidable contact with said support plate while moving between said rest and offload configurations.

3. The handtruck as in claim 1, wherein:
   said pushplate has a distal end; and
   said pushplate distal end moves parallel to said support plate while moving between said rest and offload configurations.

4. The handtruck as in claim 3, wherein said pushplate distal end has a generally cylindrical cross section.

5. The handtruck as in claim 3, wherein said pushplate distal end has at least one side extending away from said tower.

6. The handtruck as in claim 1, wherein said pushplate is generally parallel to said support plate when said pushplate is at said offload configuration.

7. The handtruck as in claim 1, wherein said at least one wheel is operatively coupled to said tower.

8. The handtruck as in claim 1, wherein said tower defines at least one said handle.

9. The handtruck as in claim 1, wherein:
said pushplate has a distal end; and
said pushplate distal end moves parallel to said support plate while moving between said rest and offload configurations.

* * * * *